United States Patent [19]

Cohen et al.

[11] Patent Number: 4,694,447
[45] Date of Patent: Sep. 15, 1987

[54] OPTICAL SIGNAL RECORDERS EMPLOYING TWO LASERS AND METHODS THEREFOR

[75] Inventors: Donald K. Cohen; Raymond Yardy, both of Tucson, Ariz.

[73] Assignee: International Business Machines Corp., Armonk, N.Y.

[21] Appl. No.: 630,456

[22] Filed: Jul. 12, 1984

[51] Int. Cl.[4] .................. G11B 7/00; G02B 27/14; G02B 5/04

[52] U.S. Cl. ......................... 369/110; 369/122; 350/174; 350/286

[58] Field of Search .................. 369/43–46, 369/110, 122; 350/174, 286; 372/108

[56] References Cited

U.S. PATENT DOCUMENTS

| 3,577,093 | 5/1971 | Simpson | 372/108 |
|---|---|---|---|
| 3,623,797 | 11/1971 | Dau | 350/286 |
| 3,743,383 | 7/1973 | Giallorenzi | 350/170 |
| 3,983,317 | 9/1976 | Gloriosso | 369/112 |
| 4,059,841 | 11/1977 | Bricot et al. | 358/128 |
| 4,085,423 | 4/1978 | Tsunoda et al. | 358/128 |
| 4,100,577 | 7/1978 | Naruse et al. | 358/128 |
| 4,118,736 | 10/1978 | Okada | 358/128 |
| 4,225,873 | 9/1980 | Winslow | 346/76 L |
| 4,241,240 | 12/1980 | Shigematsu et al. | 179/100.1 G |
| 4,334,300 | 6/1982 | Orquie et al. | 369/46 |
| 4,398,806 | 8/1983 | Bennett et al. | 350/394 |
| 4,399,529 | 8/1983 | Leterme et al. | 369/110 |
| 4,429,378 | 1/1984 | Sato | 369/110 |
| 4,458,147 | 7/1984 | Vogl et al. | 250/233 |
| 4,468,119 | 8/1984 | Homor | 356/152 |
| 4,474,434 | 10/1984 | Corlsen et al. | 350/381 |
| 4,474,435 | 10/1984 | Corlsen et al. | 350/381 |
| 4,520,472 | 5/1985 | Reno | 369/122 R |
| 4,545,651 | 10/1985 | Kato et al. | 350/174 |
| 4,546,463 | 10/1985 | Opheij et al. | 369/110 |

FOREIGN PATENT DOCUMENTS 289465 8/1971 U.S.S.R. .......................... 350/486

OTHER PUBLICATIONS

"Hitachi Laser Diodes".
"Theory & Problems of Optics"; Hecht, McGraw-Hill, ©1975, pp. 72–84.
IBM Tech. Bulletin; Sincerbox; "Laser Beam Combining"; vol. 12, No. 10, Mar. 70.
IBM Technical Disclosure Bulletin, Wynne, "Lightbeam Combiner", vol. 15, No. 4, 9-72, pp. 1399–1400.

Primary Examiner—Aristotelis M. Psitos

[57] ABSTRACT

An optical head for an optical signal recorder includes a nonpolarizing beam combiner for combining the light beams from two like-frequency, sic wavelength, lasers along one light path. The combined beams travel slightly diverging paths so that a first one of the beams can record signals on a disk while a second beam follows the first beam on the disk for direct reading-after-recording. Intermediate the combiner and the disk are a polarization type beam splitter and a focuser. One or more detectors receive reflected light from the disk via the beam splitter for detecting focus, sensed recorded signals and for tracking the beams to tracks of the disk. The combiner and splitter are preferably secured together as a single unit. The combiner uses refraction and internal reflection properties to combine the two like-frequency beams without polarization changes of either beam.

33 Claims, 3 Drawing Figures

OPTICAL SIGNAL RECORDERS EMPLOYING TWO LASERS AND METHODS THEREFOR

FIELD OF THE INVENTION

The present invention relates to optical signal recorders, particularly of the disk type, and optical data recorders of the present invention can be a compact unit with a lightweight optical head movable with respect to an optical record medium.

BACKGROUND OF THE INVENTION

1. Discussion of the Prior Art

Optical data recorders have been noted for their high areal recording density. One of the drawbacks on many of the optical data recorders is the inability to instantaneously verify that signals being recorded have been, in fact, recorded. Verification of such recording is referred to as "direct-read-after-write" (DRAW). Such DRAW requires that two light beams simultaneously impinge on the optical record medium in a predetermined spaced-apart relationship. A first light beam that records the signals onto the record medium is a high power, or high intensity, beam which alters the optical properties of the recording surface. In immediate trailing juxtaposition to the recording beam for scanning the recording created by the recording beam just after it is recorded is a second reading or sensing beam. The physical separation on the record member along a track being recorded by the recording beam is in the order of 20–60 microns. Any optical signal recorder that is to provide the DRAW capability requires the efficient generation of these two beams for simultaneously recording and readback of signals being recorded and then the separation of the light reflected from the record member of both beams. Other applications of multi-beam heads include erase-before-write (rewriteable media) and a three-beam head for erase-before-write then read-after-write.

U.S. Pat. No. 4,100,577 shows a single-laser (gaseous type), two-beam system providing the DRAW function. While the function is performed, the number of optical elements and the character of those optical elements work against providing an extremely compact optical signal recorder. Note the two extended light paths required in the beam splitting operation. Rather than provide a single laser, which requires an extremely high-power laser for providing both recording energy and sensing energy; two-laser systems have been employed. A two-laser system is attractive, particularly when semiconductive lasers are used. One widely-known prior art technique is to cross-polarize the read and write beams. This arrangement has proven not to be satisfactory because of the known problems of beam separation of the light reflected from the record member by the read and write beams. Accordingly, two lasers have been selected having significantly different frequencies such that dichroics can be used to isolate the read and write beam reflections. For example, U.S. Pat. No. 4,085,423 shows a two-laser system. One of the lasers operates at a high power, which is reflected by a dichroic mirror. That laser beam is also provided for tracking and data sensing. A second laser source of low power and of different frequency projects its beam through the dichroic mirror such that its beam is reflected to a focus-controlling photodetector. Other configurations of two laser-two frequency optical signal recorders are known. When the lasers have widely different frequencies, the thermal characteristics and focus control of the lasers becomes complicated adding to the weight and space required for implementing such a signal recorder.

U.S. Pat. No. 4,225,873 shows two gas lasers, which are extremely large and mounted on a frame rather than on a head arm which is movably across the face of an optical record disk. Because of the size of the components, including a Glan prism, mirrors and several other components, this system requires not only two lasers having different frequencies of operation which emit light having different wavelength, but results in a relatively large signal recorder.

Many diverse optical systems employ prisms for combining and separating light beams using cross-polarized light. The above-mentioned Glan prism requires that the two beams being optically processed be orthogonally polarized to achieve beam separation and combination. Other beam combiners and beam splitters have been employed using such cross-polarization of light. See *IBM TECHNICAL DISCLOSURE BULLETIN*, entitled "Light Beam Combiner" by J. J. Winne, Vol. 15, No. 4, September 1972, pp. 1399–1400. As mentioned earlier, initial cross or orthogonal polarization of the beams does not provide separation between the beams for satisfactory optical signal processing.

For good optical isolation, physical separation of the beams, as by diverging beams, is desired. The Glan prism employs refractive and reflective techniques, such as described in analytical form by Hect & Zajak in their book "Optics" published by Addison Wellsley, 1974, pp. 72–84. This publication defines the mathematics of optical refraction and internal reflection and tends to explain the operation of a Glan prism. This publication is incorporated by reference for defining the theory of operation of the present invention. Additional refractive optical signal processing is shown in the USSR Pat. No. 289465, wherein two optical members are separated by an air slot for providing an optical attenuator. A refractive optical beam combiner is shown in U.S. Pat. No. 3,743,383. This combiner is designed for high power laser beams, apparently, much more powerful than desired for optical signal recorders. It appears that these optical components and their spacing, operate because the input signals have different wavelengths. As mentioned earlier, it is desired to have both lasers, if possible, operate at the same frequency. The temperature characteristics of identical lasers tend to prevent differential focus errors between the write and read beams, such that a single focus control is easily applicable to both the reading and recording. If both lasers can electrically and optically track in a similar fashion with respect to temperature changes, then the optical signal recorder may exhibit a wider range of tolerance to temperature variations, as well as exhibiting a greater degree of stability of operation during turn on and subsequent operations.

Another aspect of providing a compact optical signal recorder is to reduce the amount of electronics involved in processing the optical signals. By reducing the electronics and taking advantage of large scale integration, electronics can be conveniently mounted on the head arm along with the optical elements. U.S. Pat. No. 4,059,841 shows a single photodetector system that responds to the reflected light beams found in the optical signal record member to provide not only data information, but also focus and tracking information. In many instances, two photodetectors are employed—one for providing tracking, and a second one for providing focus and data detection. With efficient semiconductive photodetectors, either one or two photodetectors can be employed for providing a compact optical signal recorder.

Accordingly, it is desired that an optical signal recorder be provided that uses multiple lasers of the same frequency with a minimal of optical components for minimizing optical path lengths and yet provide a recording beam of high power and a read beam of low power.

SUMMARY OF THE INVENTION

In accordance with one aspect of the invention, two identical semiconductive lasers emit beams preferably on parallel paths which are combined into a third path such that the beam from a first, or read, laser is attenuated, while the beam from a second, or write, laser is not attenuated. The two beams have a predetermined diverging relationship, such that when the beams impinge upon a record member, they are separated a predetermined distance for enabling recording and direct-read-after-write. Polarization-sensitive optics are interposed between the beam combiner and the record member for redirecting a reflected read beam to a detector such that read-after-write verification occurs. The reflected read beam may also be employed for tracking and focus control.

In another aspect of the invention, two lasers (preferably substantially identical) emit their beams into a non-polarizing or a polarization insensitive combiner and thence projected in a slightly diverging relationship to a record member for enabling recording and read-after-write. Polarization optics are interposed between the combiner and the optical disks for separating a reflected read beam for enabling data detection including direct-read-after-write verification, focus detection, and tracking control. In a variation, a dichroic element is employed in the combiner; then the lasers must have differing output wavelengths.

It is preferred that the two lasers be mounted with high thermal conductivity therebetween such that both lasers operate at the same temperature. The polarization of emitted light beams of the two lasers in any of the embodiments are preferably colinearly polarized for maximizing efficiency of the optical system. Cross-polarized or other angularly-polarized beams may also be employed.

In yet another aspect of the invention, the beam combiner, beam splitter and polarization optics are a composite but unitary member having a major light path axis parallel to the disk. A mirror optically couples the composite member through a focusing element allowing a path orthogonal to the major axis of the composite member. A detector system is mounted immediately adjacent the focuser and intermediate the major optical axis of the optical composite for minimizing the axial depth of the optics with respect to the axis of rotation of the disk. Integrated circuits are mounted on the head arm adjacent the detector, preferably intermediate the optical composite and the disk for making a compact optical signal recorder. The lasers are preferably mounted remote from the focuser and emit light beams parallel to the planar extent of the disk.

The beam combiner is preferably a refraction-internal-reflection type, wherein the read beam from a first laser is optically directed using optical properties of the beam combiner such that it can be used as a sensing beam. A beam from a second laser, which is to be a recording, or write, laser is internally reflected with insignificant attenuation. The arrangement in the beam combiner, allows a path carrying a read beam and a write beam at a slightly diverging relationship, such as one-half degree. The write beam precedes the read beam on an optical record member for enabling direct-read-after-write verification. For maintaining a desired beam cross-section of the refracted read beam an optical wedge is disposed in a slightly-spaced relationship from the surface of the beam combiner used to refract the read beam and internally reflect the write beam. In a preferred embodiment, the write beam has two internal reflections for making a more compact optical apparatus.

The foregoing and other objects, features, and advantages of the invention will be apparent from the following more particular description of preferred embodiments of the invention, as illustrated in the accompanying drawings.

DETAILED DESCRIPTION

Figure 1:
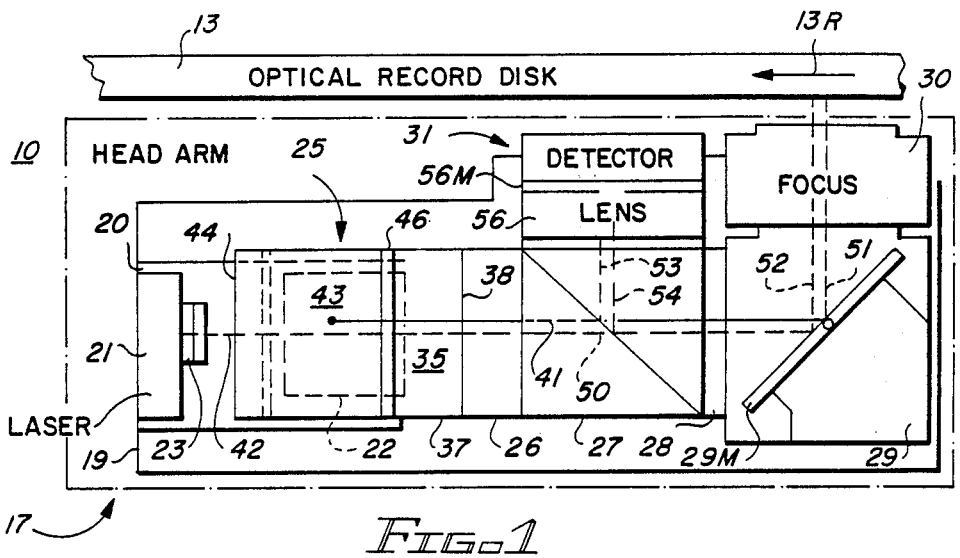
FIG. 1 is a simplified side-elevationed view of an optical head disposed adjacent to an optical record disk.
Figure 3:
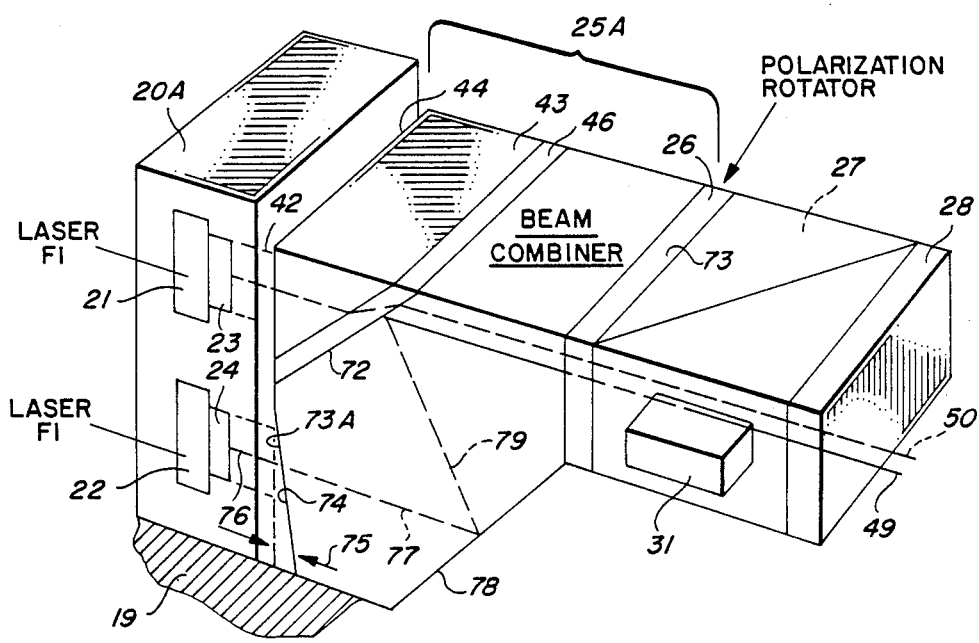
FIG. 3 diagrammatically illustrates a preferred optical composite member for use in the FIG. 1 illustrated apparatus for achieving a compact optical signal recorder.
Figure 2:
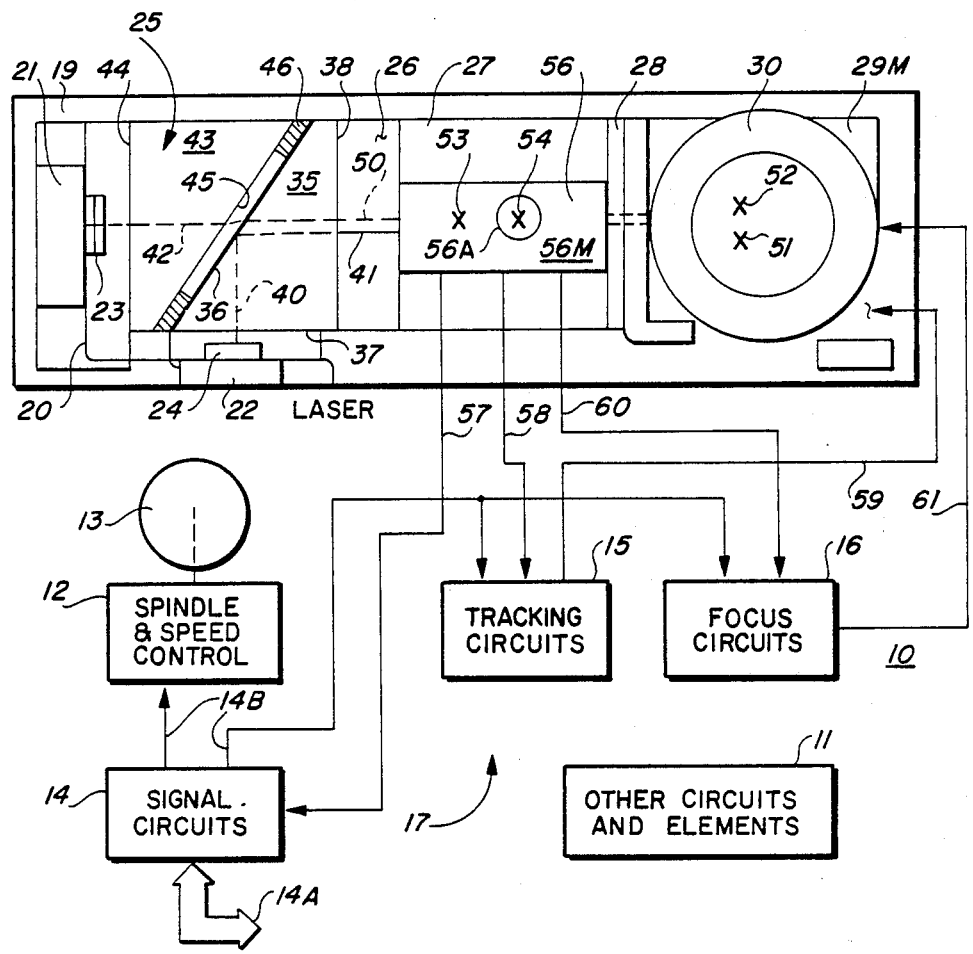
FIG. 2 is a combined diagrammatic and plan view of the FIG. 1 illustrated apparatus with the head arm being viewed along a plane intermediate the FIG. 1 record disk and the illustrated head arm assembly.

Referring now more particularly to the drawings, like numerals indicate like parts and structural features in the three figures. FIGS. 1 and 2 illustrate a first embodiment, while FIG. 3 illustrates a portion of a preferred, or second, embodiment. The optical signal recorder, generally denominated by numeral 10, is constructed using known techniques as represented by other circuits and elements 11. Optical disk 13 is mounted for rotation on a suitable spindle, which is controlled in accordance with using known techniques as represented by numeral 12. Such spindle speed control can either be a constant angular speed or an angular speed that varies with the radial position of the head arm 17 mounted for radial translation with respect to the record disk 13 in the usual manner. Information processing and control circuits 14 are connected to a host processor, communication line or other utilization device as indicated by the double-headed outline arrow 14A. The electrical connections of signal circuits 14 to various circuitry in the recorder are indicated by the plurality of lines 14B. Included in signal recorder 10 are the usual tracking circuits 15 and focusing control circuits 16. Circuits 14, 15 and 16 employ electrical signals derived from a detector, later described, for analyzing the informational content of the reflected light beams for providing optical signal data functions based upon the informational content contained on a recording coating (not shown) of the optical record disk 13. For example, data can be recorded as a series of holes, series of reflective and nonreflective areas, a series of bumps, which tend to scatter the impinging light with intermingled planar areas which tend to reflect the light, and the like. All of the informational content is arranged in a series of concentric tracks or a single spiral track on the coating surface of the optical record disk, as is well known. The function of tracking circuits 15 is to ensure that head arm 17 precisely positions the optical head over a record track being scanned. Focus circuits 16 detect the focus of a light beam to maintain good focus at the recording surface of the optical record disk 13. In FIG. 1, the recording surface is represented by the lower surface of the disk 13.

The optical head assembly employing the present invention is mounted on frame 19, which in turn is suitably mounted in head arm 17. Included in frame 19 is a highly thermal conductive portion 20, which suitably thermally connects first laser 21 and second laser 22. The first and second lasers are of the semiconductive type preferably operating at the same frequency for emitting identical wavelength light beams, the first laser 21 emitted light beam for sensing information recorded on disk 13, while the laser 22 emitted light beam is modulated for recording information on optical record disk 13. In one embodiment, the optics of the invention attenuate the energy of the first laser 21 emitted light beam such that it is suitable for reading; the power output of the first laser 21 power output is also adjustable to achieve suitable read beam power levels. The two lasers being thermally connected together tend to operate at the same temperature and therefore tend to emit light beams that vary identically with temperature changes occurring during operation of the optical signal recorder 10. This feature adds stability to the operation of the recorder and applies to those aspects of the inventions employing lasers emitting light of differing wavelengths or emitting different wavelength light.

The lasers 21 and 22 supply their light beams, respectively, through collimating optics 23 and 24. A polarization insensitive beam combiner 25 receives the beams from lasers 21 and 22 and supplies the combined beams, as later detailed, to half-wave plate 26. As will become apparent, plate 26 is desired only for making the assembly more compact for facilitating optical efficiencies of the assembly. The effect of the half-wave plate is to rotate the polarization of both beams 41, 50 simultaneously. This rotation enables beam splitter to be oriented for positioning detector 31 as shown in FIG. 1—between the disk 13 and splitter 27—for minimizing the size of the optical assembly, as will become apparent. Half-wave plate 26 is suitably bonded to combiner 25. The next optical element in the light path from the lasers to the disk is polarization-sensitive beam splitter 27 of usual construction. Beam splitter 27 is suitably bonded to the half-wave plate 26. Mounted on the output face of beam splitter 27 is one-fourth wave length polarization plate 28 which retards the polarization of both beams by 45 degrees, as is well-known. The light reflected from record member 13 is further rotated 45 degrees, such that the beam splitter rather than transmitting the light back to the splitter into the lasers, reflects the disk 13 reflected light to detector 31, which is disposed on frame 19 intermediate the major optical axis of elements 25, 26, 27 and 28, and record disk 13. Quarter-wave plate 28 is suitably bonded to splitter 27 for making a composite optical assembly consisting of combiner 25, half-wave plate 26, splitter 27 and quarter-wave plate 28.

The diverging laser beams leaving quarter-wave plate 28 are reflected by mirror assembly 29, which includes planar pivotally mounted mirror 29M which directs the diverging beams through focus element 30, an objective lens system, onto the recording surface of optical record disk 13. Mirror system 29 may be made responsive to tracking circuits 15 for providing tracking functions of the diverging beams with respect to the track defined on optical record disk 13. Alternately, focus unit 30 may flexibly mount its objective lens (not shown) to provide the tracking function using known tracking apparatus employed in combination with such focusing elements.

Inspection of FIGS. 1 and 2 shows that frame 19 provides support for a compact optical system having a simple optical path and that all of the elements mounted on the frame are in close proximity for minimizing the size of frame 19 and head arm 17. Electrical integrated circuits may be mounted on frame 19 adjacent to detector 31.

An element important to the present invention is the polarization insensitive beam combiner 25. For maximal efficiency, it is preferred that the polarization of the emitted light beams from lasers 21 and 22 be in the plane of the drawing as best seen in FIG. 2. A first optical element (amorphous glass or plastic, for example) 35 of beam combiner 25 includes a first angled surface 36. Surface 36 in a preferred embodiment provides an air-to-optical element interface which refracts the read beam 42 emitted from laser 21 and internally reflects the emitted write beam 40 received from laser 22. In a second embodiment, a known dichroic coating is included in surface 36. For the second embodiment, laser 21 emits light having a wavelength that passes through the dichroic coating (not separately shown but is represented by the surface 36) while laser 22 emits light having a wavelength that is reflected by the dichroic coating. Semiconductive lasers having similar thermal characteristics and operating at different frequencies are known.

Beam 40 enters optical element 45 through input surface 37, which is disposed substantially orthogonal with respect to output surface 38. The term "substantially orthogonal" means that the angle between beam 40 and surface 37 is near ninety degrees; the angle differs from ninety degrees in the preferred embodiment by the small angle of divergence desired between the light beams 41 and 50, such as one-half of one degree. The angle of divergence between beams 41 and 50 can be obtained by changing the angle of surface 36 with respect to the output surface 38 rather than altering the angle between beam 40 and surface 37. For avoiding refraction, it is preferred that the angle between beam 40 and surface 37 be kept close to ninety degrees. Output surface 38 pauses the diverging read and write beams to be transmitted through halfwave plate 26 as beams 41 and 50, respectively. The angle of divergence between beams 41 and 50 for the illustrated embodiment is approximately one-half degree. Surface 36 in refracting read beam 42 reduces the beam energy content by approximately 25 percent; therefore the surface acts as an optical attenuator having internal reflection properties.

The laser 21 emitted beam 42 has a predetermined cross-sectional shape, such as circular or slightly ellipsoid. When such a beam impinges upon an angled surface 36, because of the angle of incidence, the beam cross-sectional shape is distorted along one axis of the beam. To keep the beam shape from distorting, input optical element 43 is disposed upon surface 36 and spaced therefrom a short distance. In the preferred embodiment, the spacing can vary from a few microns to about one-fourth of a millimeter. The spacing should be at least about one-tenth wavelength of the lasers 21, 22 for effecting internal reflectance. As the spacing increases, the size of the optical combiner 26 gets larger. This increase in size is caused by the surface 45 refracting beam 42 away from a line extending normal or ninety degrees with respect to parallel surfaces 36 and 45, or upwardly as viewed in FIG. 2. It is desired that beam 50 extend parallel to beam 42, after being refracted by surface 36. For a large spacing, annular ring 46 can be a metallic shim; while for a micron spacing, ring 46 may consist of a suitable coating of adhesive. Coating 46 preferably bonds input optical member 43 to optical element 35. The laser 21 emitted beam 42 passes through orthogonally disposed input surface 44 of the input optical member 43. At the output surface 45 of input optical member 43, the beam 42 is refracted by the glass-to-air surface 45 away from a line normal to surface 36. It is important that the surfaces 36 and 45 be substantially planar and be disposed in a closely parallel relationship for maintaining the output beam 50 substantially parallel to input beam 42. The spacing is preferably small because the relatively large upward (FIG. 2) refractive angle of the beam 42 at surface 45. When surface 36 includes a dichroic, then surfaces 36 and 45 can be in contact.

The resultant diverging beams 41 and 50, which are still identically polarized in a preferred environment, then travel through beam splitter 27, then through quarter-wave plate 28, to be reflected to disk 13 by mirror 29M. The laser 22 emitted beam 41 is internally reflected at surface 36 as write beam 51 which goes via components 27 and 29 to optical disk 13. Read beam 50 goes through focus unit 30 as read beam 52 to optical record disk 13. The record disk 13 rotates into the plane of the drawing as viewed in FIG. 1 and as represented by arrow 13R. Write beam 51 scans a track on disk 13 immediately ahead of read beam 52. The spacing of the beams 51 and 52 on record disk 13 is preferably between 20 and 50 microns, no limitation thereto intended. The read beam is shown as a heavy dashed line while the write beam is shown as a light dashed line. These lines represent the respective optical axes of the illustrated beams, it being understood that the optical components are designed to optically process most of the energy of the illustrated beams. As best seen in FIG. 2, write beam 51 is represented by an upper "X" while read beam 52 is represented by an "X" below and space from the write beam 51. This view is looking into the focuser 30 from the disk 13. The relative motion of disk 13, as viewed in FIG. 2, is toward the top of the figure.

Optical record disk 13 reflects the beams 51 and 52, as is well-known, back along paths 51 and 52, respectively. Mirror 29M, in turn, directs the reflected beams to polarization-sensitive beam splitter 27 after passing through quarter-wave plate 28 a second time. As is well known, the polarization of the reflected beams are rotated ninety degrees with respect to the laser 21, 22 beams, respectively, beam splitter 27 then reflects both of the reflected beams toward detector 31, as beams 53 and 54, respectively, for the reflected write and read beams. Remember, the reflected write beam will have a greater intensity than the reflected read beam. While various configurations may be employed for isolating the reflected read and write beams, shown is a mask 56M disposed between detector 31 and lens 56, having an aperture 56A for passing reflected read beam 54 while blocking out reflected write beam 53. Lens 56 passes the reflected beams toward mask 56M and detector system 31. Detection system 31 can be of any known optical detector design. Alternatively, the lens and detector system can be sufficiently small such that it only receives reflected read beams; the divergence of beams 53 and 54 providing physical isolation.

The lasers 21 and 22, being of the semiconductor type, can be modulated directly by signal circuits 14 using known techniques; in particular modulating write laser 22 provides information modulation in write beam 40. Read beam 21 can be of the constant intensity type or can be intensity modulated for provided additional tracking and focusing functions.

The electronic circuits supported on head arm 17 are best understood with respect to FIG. 2. Detector 31 provides a data output signal derived from reflected read beam 52 over line 57 to signal circuits 14. This means that the data detector, preferably a single integrated-circuit chip, is suitably mounted as a part of detector system 31. Tracking information, which can be derived by detector system 31 from either the reflected write or read beam, provides tracking error information signals over line 58 to tracking circuit 15. Tracking circuit 15 analyzes the tracking error signals and provides control signals over line 59 either to tracking mirror system 29 or to the focus unit 30, whichever does the tracking function. Detector system 31 also provides focus error signals over line 60 to focus circuit 16 which, in turn, provides focus error control signals over line 61 to focus unit 30. Operations of the tracking and focus circuits 15 and 16 are well-known and not described for that reason.

The FIGS. 1 and 2 illustrated beam combiner 25 requires that lasers 21 and 22 be disposed to emit substantially orthogonal beams (the angle between the laser 21, 22 beams is ninety degrees plus or minus the angle of divergence of beams 41, 50). FIG. 3 illustrates a preferred embodiment wherein the lasers 21 and 22 emit substantially parallel beams such that thermal conduction mount 20A is smaller, hence lighter and the lasers are closer together. This means that the lasers 21 and 22 operate at a much closer temperature and therefore operate more consistently with temperature changes. Thermal conduction unit 20A is diagrammatically shown for illustrating the close proximity of the two lasers. Read laser 21 cooperates with the preferred beam combiner 25A as described with respect to FIGS. 1 and 2. The other elements of the optical composite, including the described optical components, are suitably bonded as described for FIGS. 1 and 2. The write or second laser 22 is mounted coplanar with laser 21 on thermal conduction mount 20A such that its emitted write or recording beam 76 is substantially parallel to the emitted read beam 42. In a preferred arrangement; the laser beams diverge at about the desired angle of divergence; such small divergence is defined as substanially parallel.

This preferred mounting requires additional optical processing for effecting the desired diverging beam combination. For the additional processing, beam combiner 25 includes a depending portion for changing the direction of the laser 22 beam 26. The input surface 74 of beam combiner 25A for the write beam 76 is also angled with respect to the input plane including input surface 44 of optical input element 43. For the illustrated embodiment, this angle 75 is less than one degree for corresponding to the desired angle of divergence and for receiving the laser 22 emitted light beam orthogonally to its surface plane. When the laser 22 beam is parallel to laser 21 beam, hence not orthogonal to surface 74, input surface 74 slightly refracts the write beam 76 along optical axis 77 to internal reflective surface 78. Otherwise, the laser 22, already at a small angle of precise orthogonality, is not refracted by surface 74, but is already aligned with path 77. The refracted or internal beam 77 is internally reflected by surface 78 along optical axis 79 onto input-reflective surface 72, which corresponds to surface 36 shown in FIGS. 1 and 2. The output write beam diverges from the read beam 50 at an angle of less than one degree. Other than the above-described changes, operation of an optical head in the preferred embodiment is identical to that described for FIGS. 1 and 2. As seen in FIG. 3, looking at combiner 25A from a record disk 13, detector system 31 is mounted on the face of splitter 27 facing the viewer; mirror 29 is disposed to reflect the beams 49, 50 toward the viewer. Rather than dispose surface 74 at a light angle 75 with respect to output surface 73, surface 74 can be parallel to surface 73 requiring laser 22 be mounted at an angle thereto such that beam 76 is refracted to beam 77. Other geometric variations can also be employed.

In an additional alternate embodiment, surface 72 includes dichroic characteristics. Lasers 21, 22 emit different wavelength light such that the dichroic version of surface 72 passes the laser 21 wavelength light and reflects the laser 22 wavelength light.

The optical members 35,43 of combiner 25 and optical members constituting combiner 25A consist of amorphous optical glass. Other optical amorphous materials, such as plastic materials, can be readily substituted for the optical glass. Such materials are not birefringent; such as crystalline materials of many beam combiners. The index of refraction of the materials and the wavelength of the laser beams emitted by lasers 21,22 affect the angles required for constructing the described polarization insensitive beam combiners. The indices of refraction of various materials are empirically determined in a usual manner. The indices of refraction of many commercially available optical materials are published by the various manufacturers. As one example, optical glass used in constructing one embodiment of the invention has an index of refraction of 1.511. Using the known wavelength of the emitted radiation of lasers 21,22 and the index of refraction, the equations, particularly equation (4.63) on page 80, of the "Optics" article, supra, can be used to calculate the angles necessary for constructing a beam combiner using the present invention. Such calculations also lead to a desired spacing between surfaces 36 (or 72) and 45 as described earlier. The angle 75 of surface 74 with respect to the plane of output surface 73 will also vary with the above-described parameters and can be calculated as well using the teachings of the above-cited article. The calculations are simplified when all of the members of the combiner have the same index of refraction; such a selection is not required to practice the present invention. Also, when lasers 21,22 supply beams of light having the same wavelength, design and construction of the combiner 25,25A is simplified.

One spacing selected for a constructed embodiment was abcut ten-thousands of one inch. In one embodiment, spring-shaped spacer 46 consisted of deposited spacer, such as a metal or a glass. Norland 61 adhesive, a commercially available adhesive, may be used to bond all of the optical components of the described optical composite. The approximate axis of beam 50 is deemed to be the major axis of the optical composite and is preferably disposed parallel to the plane of optical record disk 13 as best seen in FIG. 1. This arrangement tends to minimize the axial depth of the optical disk recorder 10. While it is not necessary for the beams to enter the combiner orthogonally to the various input surfaces, for desired power transfer and beam direction to obtain diverse angles of divergence in between beams 41, 50, this orthogonal relationship should be maintained.

Using the above criteria, one embodiment of the beam combiner 25A surface 72 was disposed at 41 degrees, 15 minutes with respect to surface 73, surfaces 74 and 72 subtended an angle of about 137 degrees, 46 minutes and the gap between surfaces 72 and input optical wedge 43 was about 0.25 millimeters. The output surface 73 was parallel to input surface 44, the latter surface was orthogonal (to the axis of beam 42). Combiner 25A consisted of amorphous glass having an index of refraction of 1.511 and an objective lens and focal length of objective lens in focuser 30, such that an angle of divergence subtended by the axes of light beams 41 and 50 resulted in a separation of about 20 microns on the optical disk 13.

While the invention has been particularly shown and described with reference to preferred embodiment thereof, it will be understood by those skilled in the art that various changes in form and details may be made therein without departing from the spirit and scope of the invention.

What is claimed is:

1. In an optical head for an optical disk recorder, the improvement comprising:

first and second lasers for emitting first and second light beams of substantially the same frequency and light beam intensity;

circuit means connected to said first and second lasers for operating both said lasers at a same power level;

thermal mounting means mounting said first and second lasers in high thermal conductive relationship such that the temperature of operations of the first and second lasers tend to be similar;

a polarization-insensitive beam combiner having amorphous optical materials and being optically coupled to the lasers for transferring both the beams along a single light path without altering the polarization of the two light beams and in a slightly diverging relationship, means in said combiner for attenuating the light beam intensity of said first light beam sufficiently to enable the attenuated light beam to read recorded information on an optical disk without altering the recording thereon; and optical means in said single light path for introducing identical polarization changes to both said beams and a polarization-sensitive beam splitter optically interposed between said combiner and optical means for directing reflected light beams derived from said first and second light beams into two diverging light paths for enabling detection of one of said two reflected light beams and wherein said beam combiner has a first optical element consisting of a predetermined amorphous optical material and having a first surface (36) angled with respect to said emitted first and refract said emitted first light beam and being a part of said attenuator means and having a second input surface (37) disposed to receive said second light beam such that said first surface intercepts the second light beam and internally reflects the second light beam but not as a part of said attenuator means, said refraction and reflection directing the light beams along a given light path having a major axis and said refracted and reflected light beams having a predetermined small angle of divergence and wherein said first optical element further includes an internal reflection surface optically interposed between said first angled srface and said second laser such that said second light beam is internally reflected a plurality of times within said first optical element; and said first and second lasers being disposed with respect to each other to emit substantially parallel beams of light.

2. The optical head set forth in claim 1, wherein said optical means includes objective lens means having a predetermined focal length and said first and second light beams having a predetermined angle of divergence along said single light path, having a predetermined relationship to said focal length for achieving a predetermined physical separation of the said two light beams on an optical record member in said optical disk recorder.

3. The optical head set forth in claim 2, wherein said angle of divergence is not greater than one degree.

4. The optical head set forth in claim 1, further including an input optical element having an input optical surface orthogonally disposed with respect to said first light beam for intercepting same and having an angled surface forming a part of said attenuator means and which is disposed parallel to in an optically-closely-spaced-apart relationship to said first angled surface and wherein said first angled surface forms a second part of said attenuator means; and means bonding said input and first optical elements as a unitary member.

5. The optical head set forth in claim 4, further including means bonding said optical means to said first optical element to form an optical composite elongated along said major axis and disposed with respect to said beam combiner for receiving said diverging first and second light beams.

6. The optical head set forth in claim 5, further including a one-half-wave-length plate disposed between said beam combiner and said optical means and bonded to both said beam combiner and said optical means.

7. The optical head set forth in claim 6, further including a quarter-wave optical plate bonded to said polarization-sensitive beam splitter remote from said beam combiner and facing away therefrom.

8. The optical head set forth in claim 7, further including a mirror disposed at a predetermined angle with respect to said major axis for receiving and reflecting said diverging light beams to an optical record member through said objective lens, wherein said angle of divergence is relatable to the focal length of said focuser from said beam combiner to said optical record disk via said mirror.

9. The optical head set forth in claim 8, wherein said beam combiner has first and second input surfaces respectively disposed substantially orthogonal to the beams emitted by said first and second lasers and said beam combiner having an output surface disposed substantially orthogonal to said major axis.

10. In an optical device, the optical head set forth in claim 1 wherein said polarization-sensitive beam combiner includes a prism comprising a unitary body of said amorphous optical materials and having an approximate parallelopied shape, having an output planar optical surface facing and the body being attached to said optical means such that said single light path is disposed to extend through said output surface into said optical means, having a planar input surface and an internal reflective surface facing away from and disposed at an angle of about 41 degrees and 15 minutes with respect to said output surface and said input reflective surface all forming a part of said attenuating means and for receiving said first light beam and refracting same as the first light beam enters the unitary prism, having a planar internal-reflective surface facing away from and being parallel to said input-reflective surface, and having a second planar input surface facing away from said output surface and internally to said prism facing said reflective surface and disposed with respect to said input-reflective surface at an angle of about 137 degrees and 46 minutes such that the output surface and said second input surface diverge toward said input-reflective surface and for receiving said second light beam for transmitting same inside said unitary prism toward said planar internally-reflective surface without attenuation.

11. The optical head set forth in claim 10, further including an optical wedge having a third planar optical-input surface facing away from and disposed parallel to said output surface and having a planar hypotenuse surface tending an angle of about 41 degrees 15 minutes with respect to said third input surface which angle opens in a direction opposite to the first-mentioned 41 degree 15 minute angle and said hypotenuse surface being disposed parallel to said input and internal-reflective surface and forming a part of said attenuating means and being disposed in close juxtaposition to said input and internal-reflective surface said third planar optical input.

12. The optical head set forth in claim 11, further including a thin annular coating disposed adjacent the peripheries of said input and internal-reflective and hypotenuse surfaces for bonding the optical wedge to the prism while keeping the input and internal-reflective and hypotenuse surfaces precisely parallel.

13. In a optical head for an optical disk recorder, the improvement comprising:

first and second lasers for emitting first and second light beams of substantially the same frequency and light beam intensity;

circuit means connected to said first and second lasers for operating both said lasers at a same power level;

thermal mounting means mounting said first and second lasers in high thermal conductive relationship such that the temperature of operations of the first and second lasers tend to be similar;

a polarization-insensitive beam combiner having amorphous optical materials and being optically coupled to the lasers for transferring both beams along a single light path without altering the polarization of the two light beams and in a slightly diverging relationship;

said beam combiner including first and second input surfaces disposed in two planes disposed at a small angle with respect to each other for effecting said small divergence of said first and second light beams for receiving said first and second light beams from said first and second lasers respectively and the beam combiner also including first and second closely-spaced-apart, parallel-extending optical surface means both inclined at a predetermined angle with respect to and crossing the light axis of said first laser emitted light beam for intercepting and attenuating the beam intensity of said first laser emitted light beam; and optical means in said single light path for introducing identical polarization changes to both said beams and a polarization-sensitive beam splitter optically interposed between said combiner and optical means for directing reflected light beams derived from said first and second light beams into two diverging light paths for enabling detection of one of said two reflected light beams.

14. The optical head as set forth in claim 13, further including optical detecting means in said head positioned with respect to said optical means for receiving light therefrom along a light path substantially orthogonal to the light path of said first and second light beams through said optical means and arranged so as to intercept any light reflected from said first one light beam.

15. The optical signal recorder as set forth in claim 13, wherein said polarization-insensitive means including attenuator means for passing said emitted light beam from said first laser to serve as a sensing or read-back light beam and including internal reflection means for passing said emitted light beam from said second laser with substantially no attenuation such that said emitted light beam of the said second laser is usable as a recording light beam.

16. In an optical signal recorder having an optical recording disk support for relatively moving an optical record disk with respect to optical transducer means movably supported with respect to the optical record disk;

the improvement including a new optical transducer means, including the combination of:

first and second laser means for operating at substantially the same frequency and for respectively emitting light beams along respective light axes and having similar wavelengths and light intensities respectively for reading and recording signals from and to the optical record disk;

means for mounting both said laser means in close proximity and having a high thermal conductivity portion in a thermal conduction connection with both said laser means such that both of said laser means operate at substantially the same temperature;

first optical means optically coupled to both said laser means for receiving both said emitted light beams and for combining same into a single light path, but in a diverging relationship to each other at a predetermined angle less than about one degree the first optical means including first and second closely-spaced-apart, parallel-extending optical surface means both inclined at a predetermined angle with respect to and crossing the light axis of said first laser means emitted light beam for intercepting and attenuating the beam intensity of said first laser means emitted light beam for such beam to serve as a read beam;

and furthermore wherein said first optical means includes first and second input surfaces disposed in two planes disposed at a small angle with respect to each other for effecting said small divergence of said first and second light beams;

second optical means optically coupled to said first optical means for receiving said diverging combined light beams and for transferring same to said optical record disk for respectively reading and recording signals from and on said optical record disk and for receiving light reflected from said optical record disk caused by at least one of said combined emitted light beams; and detector means in said second optical means for receiving said reflected light as received by said second optical means for detecting said reflected light to indicate its contained informational content.

17. The optical signal recorder set forth in claim 16, wherein said first and second laser means are disposed in a side by side relationship such as to emit substantially parallel light beams of similar power levels.

18. The optical signal recorder set forth in claim 17, wherein said first optical means has receiving means including optical surface means (44) facing said first and second laser means for receiving said emitted light beams respectively in spaced-apart relationship and further having multiple internal reflection surfaces (72,78) for reflecting the light beam from said second laser beam and, at least one of said internal reflection surface (72) being an internal surface of said second closely-spaced-apart means and receiving the light beam from said first laser means for refracting same at approximately the same point of internally reflecting emitted light beam from said second laser beam such that the light intensity of the emitted light beam from said first laser means is attenuated such that it can be used as a read beam while the emitted light from said second laser means is transmitted through said first optical means with insubstantial attenuation so it can be used as a recording or write beam.

19. The optical signal recorder set forth in claim 18, wherein said second optical means has an input surface secured to said first optical means for receiving said emitted light beams and includes a polarization-sensitive beam splitter with a one-quarter-wave beam rotating plate bonded to the splitter and is optically disposed in between the splitter and said optical record disk and having a polarization-sensitive reflecting plane disposed at forty-five degrees with respect to one of said diverging emitted beams such that said one diverging emitted beam which is reflected from said optical disk is reflected by said polarization-sensitive beam splitter toward said optical record disk, but displaced from the point of impingement of the emitted light beam on said optical record disk and said detector means of said optical means being disposed intermediate to said optical record disk and said polarization-sensitive beam splitter.

20. The optical signal recorder set forth in claim 19, further including objective lens means in said second optical means having a given focal length and being disposed a predetermined distance from said optical disk and said beams diverging at a given angle of divergence having a predetermined relationship to said focal length of said objective lens and the spacing of said objective lens from said optical disk.

21. The optical signal recorder set forth in claim 20, further including a mirror disposed immediately adjacent to said one-quarterwave rotating plate for reflecting said diverging emitted beams at a substantial right angle to said diverging beams and said objective lens being disposed between said mirror and said optical record disk and immediately adjacent to said detector means.

22. The optical signal recorder set forth in claim 21, wherein said first optical means includes an input optical wedge having said input surface which receives said first laser means emitted light beam and including said first optical surface means disposed parallel to said second optical surface means which is also one of said internal reflection surfaces such that the shape of the emitted light beam of said first laser means is not changed in cross-section as it passes through the first optical means and said first and second optical surface means being disposed at about 41 degrees with respect to said single light path.

23. The optical signal recorder set forth in claim 22, wherein said first optical surface means of said input optical wedge is disposed in closely-spaced relationship of about 0.25 millimeters with respect to said second optical surface means with air being disposed in the space between said two closely-spaced-apart surface means and said surface means being closely parallel with respect to each other; and means at and between said surface means for securing said optical wedge to said second optical surface means.

24. The optical signal recorder set forth in claim 23, wherein said first and second optical means have a major optical axis substantially elongated with respect to said first and second emitted light beams and being disposed parallel to the plane of said optical disk such that the axial length of the optical signal recorder is minimized.

25. The optical signal recorder set forth in claim 24, further including tracking and focus means electrically coupled to said detector and disposed in close proximity thereto intermediate said major optical axis and the plane of said optical record disk.

26. In an optical information-bearing signal recorder having relatively movable record and transducer members, the improvement including, in combination:

light path means for bidirectionally transmitting beams of light;

first and second lasers respectively emitting first and second collimated light beams having similar power output levels, identical wavelengths and similar polarizations with respect to axes of the light beams, respectively, toward said light path means along a major axis;

a nonpolarization-sensitive beam combiner optically coupled to said first and second lasers for receiving said first and second light beams from said lasers and in a manner so as to internally reflect the emitted second light beam in a predetermined portion of the beam combiner toward said light path means for transmission along a first direction and to transmit the emitted first light beam through the beam combiner toward said light path means without internal reflection also in said first direction toward said light path means and the beam combiner also including first and second closely-spaced-apart, parallel-extending optical surface means both inclined at a predetermined angle with respect to and crossing the light axis of said first laser emitted light beam for intercepting and attenuating the beam intensity of said first laser emitted light beam; and furthermore wherein said nonpolarization-sensitive beam combiner includes first and second input surfaces disposed in two planes at a small angle with respect to each other for effecting a small divergence of first and second collimated light beams;

a polarization-sensitive beam splitter, including a quarter-wave plate, optically coupled to said beam combiner for receiving said first and second light beams travelling in said first direction along said axis and being coupled to said light path means for transmitting both of said emitted light beams to the light path means and for receiving light beams from the light path means;

objective lens means optically coupled to said polarization beam splitter through said light path means for receiving said transmitted light beams and directing same to said record member and for transmitting reflected light beams received from said record member through said light path means to said polarization beam splitter such that the polarization beam splitter directs said record member reflected light beams away from said beam combiner; and detector means optically coupled to said polarization-sensitive beam splitter for receiving the polarization beam splitter directed beam corresponding to said emitted first light beam whereby focus, tracking and data detection is achievable based upon said emitted first light beam and recording of signals is achievable by said emitted second light beam.

27. The signal recorder as set forth in claim 26, further including in combination:

said nonpolarization-sensitive beam combiner and said polarization-sensitive beam splitter passing said light beams along said major axis, a mirror at one end of said optical signal recorder and optically coupled to said polarization-sensitive beam splitter and said objective lens means such that the light passing through said objective lens means is orthogonal to said major axis and that said record member lies in a plane parallel to said major axis.

28. The signal recorder as set forth in claim 26, wherein said nonpolarization-sensitive beam combiner includes only amorphous materials.

29. The signal recorder as set forth in claim 28, further including an optical wedge in said nonpolarization-sensitive beam combiner interposed between said first laser and aligned with said first direction and having an input surface for receiving said first laser light beam orthogonally and having attenuated output optical surface means disposed in a parallel closely-spaced-apart relationship to said beam combiner such that the light intensity of the first light beam is attenuated and such that the cross-sectional shape of the attenuated first light beam does not change.

30. The signal recorder as set forth in claim 26, further including, in combination: and in a side-by-side relationship for emitting said light beams in a substantially parallel relationship to each other;

thermal-coupling-mounting means for mounting said first and second lasers with respect to said nonpolarization-sensitive beam combiner such that said first and second lasers operate at substantially the same temperature.

31. In an optical head for an optical disk recorder, the improvement comprising:

first and second lasers for emitting first and second light beams of substantially the same frequency and light beam intensity;

thermal mounting means mounting said first and second lasers in high thermal conductive relationship such that the temperature of operations of the first and second lasers tend to be similar;

a polarization-insensitive beam combiner having amorphous optical materials and being optically coupled to the lasers for transferring both the beams along a single light path without altering the polarization of the two light beams and in a slightly diverging relationship, means in said combiner for attenuating the light beam intensity of said first light beam sufficiently to enable the attenuated light beam to read recorded information on an optical disk without altering the recording thereon;

optical means in said single light path for introducing identical polarization changes to both said beams and a polarization-sensitive beam splitter optically interposed between said combiner and optical means for directing said light beams derived from said first and second light beams into two diverging light paths for enabling detection of one of said two reflected light beams;

objective lens means having a predetermined focal length and said first and second light beams having a predetermined angle of divergence of not greater than one degree along said single light path, having a predetermined relationship to said focal length for achieving a predetermined physical separation of the said two light beams on an optical record member in said optical disk recorder;

said beam combiner has a first optical element consisting of a predetermined amorphous optical material and having a first surface angled with respect to said emitted first and second light beams and disposed to receive and refract said emitted first light beam and being a part of said attenuator means and having a second input surface disposed to receive said second light beam such that said first surface intercepts the second light beam and internally reflects the second light beam but not as a part of said attenuator means, said refraction and reflection directing the light beams along a given light path having a major axis and said refracted and reflected light beams having a predetermined small angle of divergence;

said first optical element includes an internal reflection surface optically interposed between said first angled surface and said second laser such that said second light beam is internally reflected a plurality of times within said first optical element;

said first and second lasers being disposed with respect to each other to emit substantially parallel spaced-apart beams of light;

an input optical element having an input optical surface orthogonally disposed with respect to said first light beam for intercepting same and having an angled surface forming a part of said attenuator means and which is disposed parallel to in an optically-closely-spaced-apart relationship to said first angled surface and wherein said first angled surface forms a second part of a said attenuator means;

means bonding said input and first optical elements as a unitary member;

means bonding said optical means to said first optical element to form an optical composite elongated along said major axis and disposed with respect to said beam combiner for receiving said diverging first and second light beams;

a one-half-wave-length plate disposed between said beam combiner and said optical means and bonded to both said beam combiner and said optical means;

a quarter-wave optical plate bonded to said polarization-sensitive beam splitter remote from said beam combiner and facing away therefrom;

a mirror disposed at a predetermined angle with respect to said major axis for receiving and reflecting said diverging light beams to an optical record member through said objective lens, wherein said angle of divergence is relatable to the focal length of said focuser from said beam combiner to said optical record disk via said mirror;

said beam combiner has first and second input surfaces respectively disposed substantially orthogonal to the beams emitted by said first and second lasers and said beam combiner having an output surface disposed substantially orthogonal to said major axis;

said first optical element includes a third angled surface facing away from said first angled surface and being disposed in a plane substantially parallel thereto, and said second input surface intercepting said second light beam from said second laser means for projecting the received second light beam to said third angle surface for internally reflecting same to said first angled surface such that, that first angled surface internally reflects said second beam along said major axis; and said second input surface being disposed in a plane at a predetermined small angle with respect to said output surface for achieving said diverging of said first and second light beams along said major axis.

32. The optical head as set forth in claim 31, further including thermal conductive means in said optical head for supporting said first and second lasers means in thermal conductive relationship such that the two laser means operate at substantially the same temperature, and such that said first and second light beams are emitted therefrom in a substantial parallel relationship.

33. The optical head as set forth in claim 32, wherein said first and second laser means include semiconductor lasers which are substantially identical and have substantially identical electrical and optical operating characteristics for emitting said first and second light beams to be substantially identical.

* * * * *